United States Patent [19]

Ackermann et al.

[11] Patent Number: 5,003,835
[45] Date of Patent: Apr. 2, 1991

[54] TORQUE SUPPORT FOR DRIVES RIDING ON TRUNNIONS, PARTICULARLY FOR CONVERTER TILT DRIVES

[75] Inventors: Wilhelm Ackermann, Essen; Karlheinz Langlitz, Mülheim; Günter Schmitz, Duisburg, all of Fed. Rep. of Germany

[73] Assignee: Mannesmann Aktiengesellschaft, Düsseldorf, Fed. Rep. of Germany

[21] Appl. No.: 388,562

[22] Filed: Aug. 1, 1989

[30] Foreign Application Priority Data

Aug. 9, 1988 [DE] Fed. Rep. of Germany ....... 3827329

[51] Int. Cl.⁵ ............... F16H 55/22; F16H 37/06; B29C 39/12; F16F 9/00
[52] U.S. Cl. ............... 74/411; 74/665 GC; 74/665 B; 74/606 R; 266/245; 266/246; 266/247; 188/317; 188/322.15; 248/562; 248/636
[58] Field of Search ............ 74/606 R, 614, 665 GC, 74/665, 380, 410, 411; F16F/9/00; 266/245, 246, 247; 248/636, 638, 591, 562; 188/316, 317, 322.5

[56] References Cited

U.S. PATENT DOCUMENTS

| | | | |
|---|---|---|---|
| 1,409,287 | 3/1922 | Fidmann | 188/317 |
| 2,421,822 | 6/1947 | Wood | 248/562 |
| 2,516,172 | 7/1950 | Baldwin | 188/317 |
| 3,151,502 | 10/1964 | Kron et al. | 74/665 B |
| 3,400,603 | 9/1968 | Stafford | 74/411 |
| 4,224,836 | 9/1980 | Riegler et al. | 266/245 X |
| 4,759,262 | 7/1988 | Hay, II | 248/636 |
| 4,800,995 | 1/1989 | Bernhardt et al. | 188/317 |
| 4,803,896 | 2/1989 | MacGregor | 74/606 R |
| 4,815,574 | 3/1989 | Taylor et al. | 188/322.15 |

FOREIGN PATENT DOCUMENTS

| | | | |
|---|---|---|---|
| 0035109 | 2/1980 | European Pat. Off. | |
| 0432488 | 4/1947 | Italy | 188/94 |
| 0403745 | 3/1974 | U.S.S.R. | 266/245 |

Primary Examiner—Allan D. Herrmann
Assistant Examiner—Winnie Yip
Attorney, Agent, or Firm—Cohen, Pontani & Lieberman

[57] ABSTRACT

A torque support for drives riding on trunnions, in particular for converter tilt drives, including a gear housing mounted on the trunnion which is rotatable about an axis of rotation, a drive motor attached by a flange or bolting to a step-down gearing which engages, via pinion, with a larger gear wheel fixed for rotation on the trunnion. The torque support includes a pair of guide rods located symmetrically to the axis of rotation of the trunnion, each guide rod includes a first and second oppositely positioned part, the first and second rod part have an upper and lower end and a respective free end opposite thereto; the upper ends are pivotally mounted on the gear housing and the lower ends are connected to each other via either a compression-tension bar or torsion shaft, upon which the lower ends are pivotally mounted. A spring element which connects the free ends of the first and second guide rod parts in spaced relation from the mounts acts in tension and compression and includes springs and a mechanism for predeterminately pre-stressing the springs.

5 Claims, 5 Drawing Sheets

TORQUE SUPPORT FOR DRIVES RIDING ON TRUNNIONS, PARTICULARLY FOR CONVERTER TILT DRIVES

FIELD OF THE INVENTION

The present invention relates to a torque support for drives riding on trunnions, in particular for converter tilt drives, including a gear housing mounted on the trunnion, a drive motor attached to a step-down gearing which engages, via a pinion, with a larger gear wheel fixed for rotation on the trunnion, and a pair of guide rods located symmetrically to the axis of rotation of the trunnion.

BACKGROUND OF THE INVENTION

Similar riding drives are known from U.S. Pat. No. 3,400,603 and European Patent 00 35 109 A1. The guide rods present in those systems transmit the forces of reaction of the tilt drive either to a torsion rod (see U.S. Pat. No. 3,400,603) or to a tension-compression bar (see European Patent 00 35 109 A1). These systems have the disadvantage that the sudden application of load or else vibrations of the system, such as occur due to resonances upon the blowing, cannot be fully controlled.

SUMMARY OF THE INVENTION

The object of the present invention is to improve the known systems in such a manner that vibration peaks in the critical vibration range of 1 to 8 Hertz and the injurious effects of the sudden application of load are substantially avoided.

This object is achieved by providing a torque support for drives riding on trunnions, in particular for converter tilt drives, including a gear housing mounted on the trunnion which is rotatable about an axis of rotation, a drive motor attached by a flange or bolting to a step-down gearing which engages, via pinion, with a larger gear wheel fixed for rotation on the trunnion, the torque support comprising a pair of guide rods located symmetrically to the axis of rotation of the trunnion, each guide rod comprising a first and second oppositely positioned part, the first and second rod part having an upper and lower end and a respective free end opposite thereto; means for pivotally mounting the upper ends on the gear housing; means for pivotally mounting the lower ends to means for interconnecting the lower ends to each other, said interconnecting means comprising, for example, either a torsion shaft or compression-tension rod; and a spring element for connecting the free ends of the first and second guide rod parts in spaced relation from the mounting means, the spring element acting in tension and compression and comprising springs and means for predeterminately pre-stressing the springs. Further embodiments of the device in accordance with the present invention are set forth hereinafter.

BRIEF DESCRIPTION OF THE DRAWINGS

The invention will be described in further detail with reference to the drawings in which.

DETAILED DESCRIPTION OF THE PRESENTLY PREFERRED EMBODIMENTS

Figure 1A:
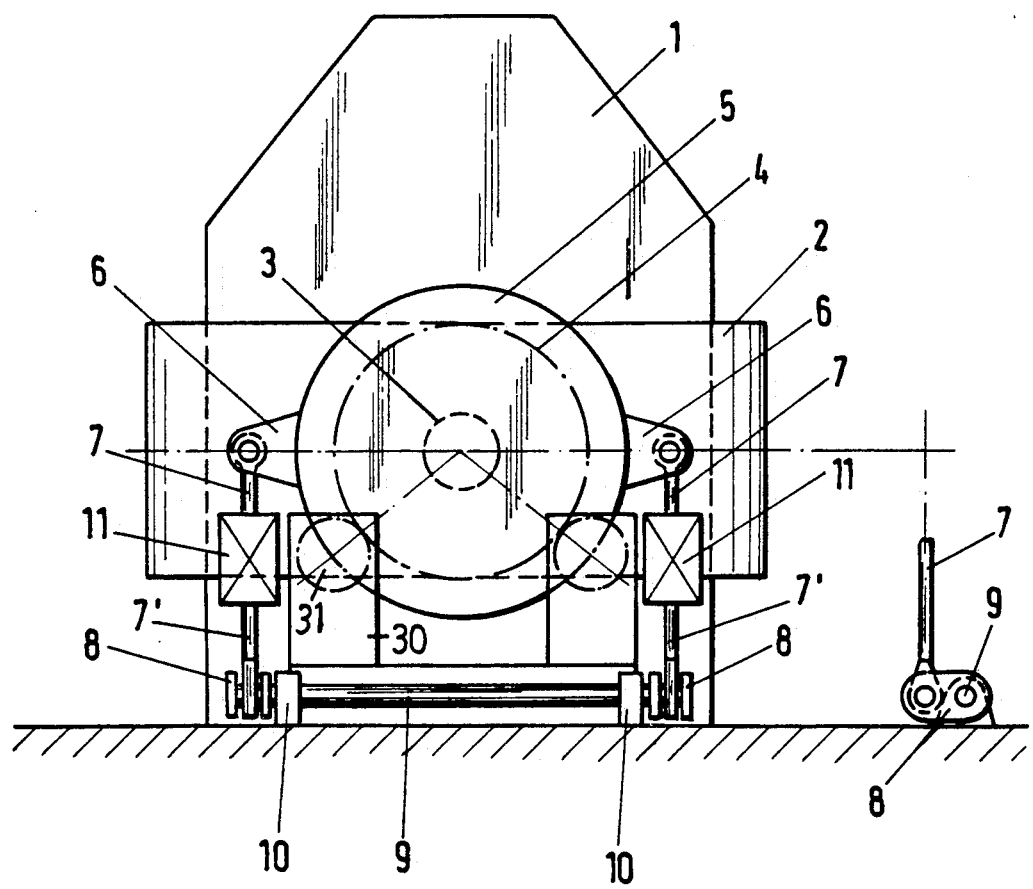
FIG. 1A is a view of a converter with guide-rod system and torsion rod.
Figure 1B:
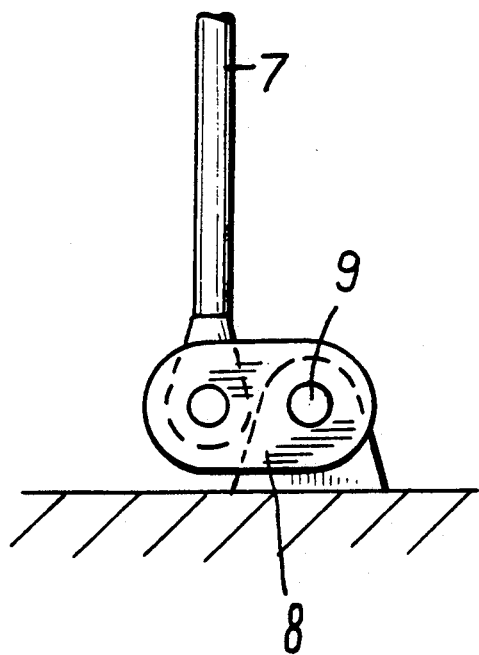
FIG. 1B is a partial side view of a detail of FIG. A.

In the drawings the same parts have been provided with the same reference numbers.

FIG. 1A shows a converter vessel 1 having a support ring 2, a converter trunnion 3 a large gear 4 a drive motor 30, and a pinion 31. The tilt drive 5 is arranged astride the converter trunnion 3. Lugs 6 of the housing of the tilt drive 5 transmit the forces of reaction of the drive to guide rods 7. The forces are conducted away from the guide rods 7, via a lever 8, to a torsion shaft 9. The torsion shaft 9 is fastened, via bearings 10, on a foundation.

Figure 2:
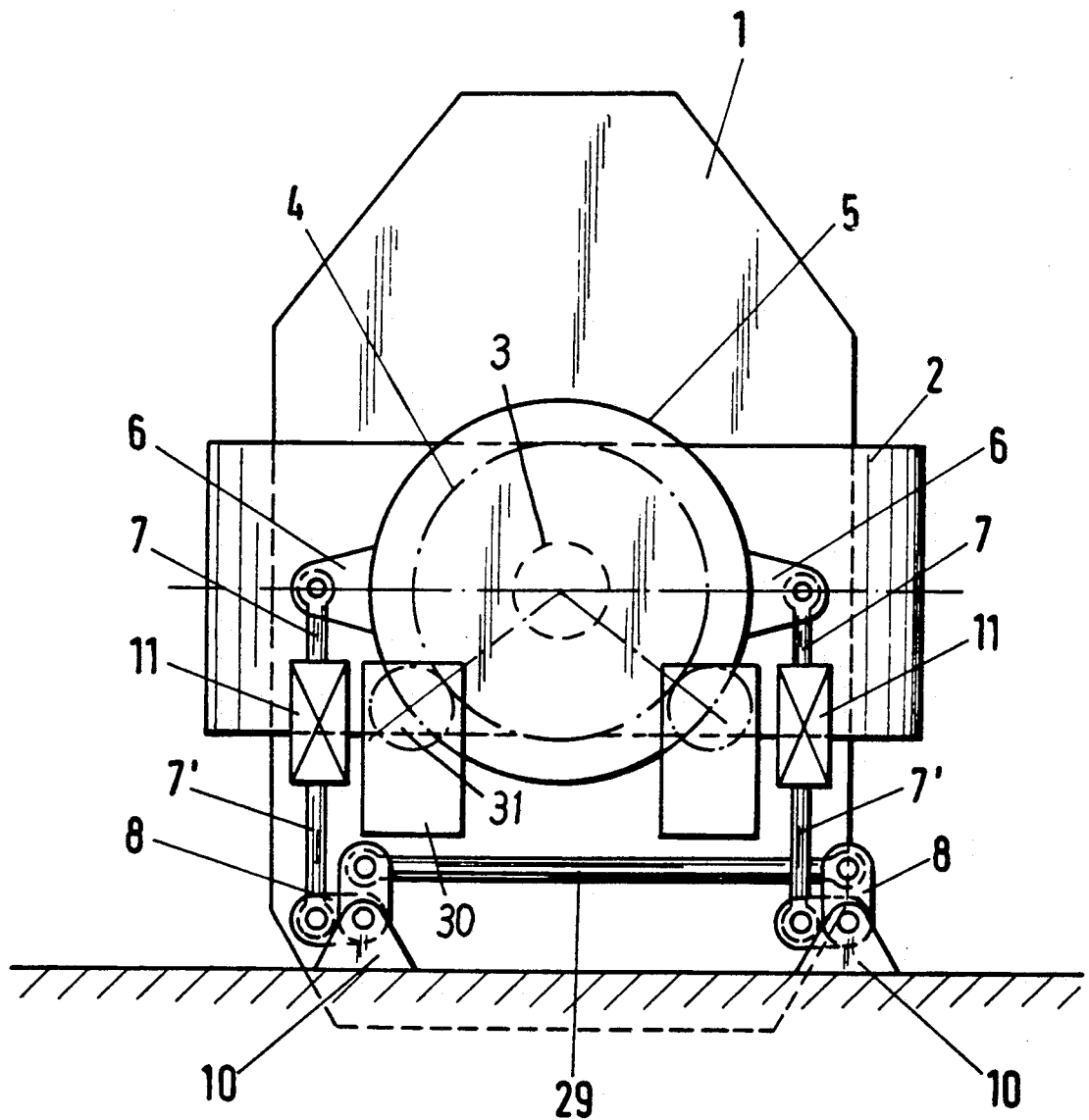
FIG. 2 is a view of a converter with guide-rod system and a compression tension bar connection.

FIG. 2 shows a construction similar to FIG. 1A. In this case the lower guide rods 7' are articulately connected via levers 8 to a compression-tension rod 29.

Figure 3:
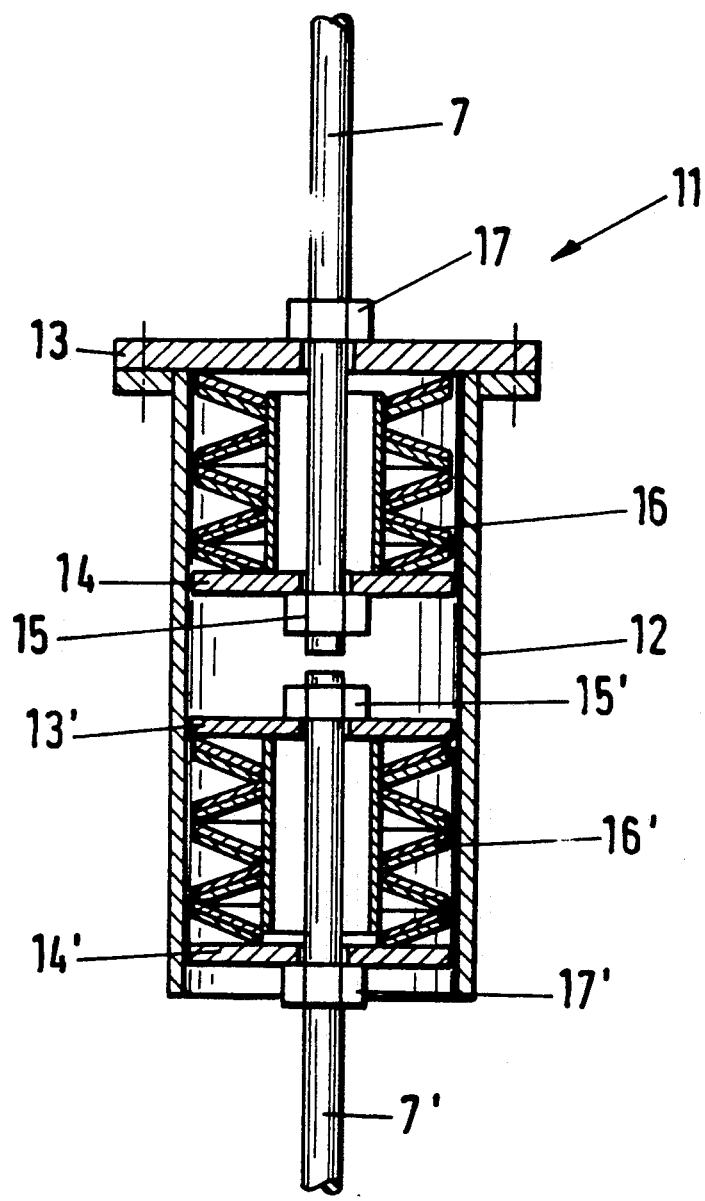
FIG. 3 is a sectional view of a pre-tensionable spring element.
Figure 4:
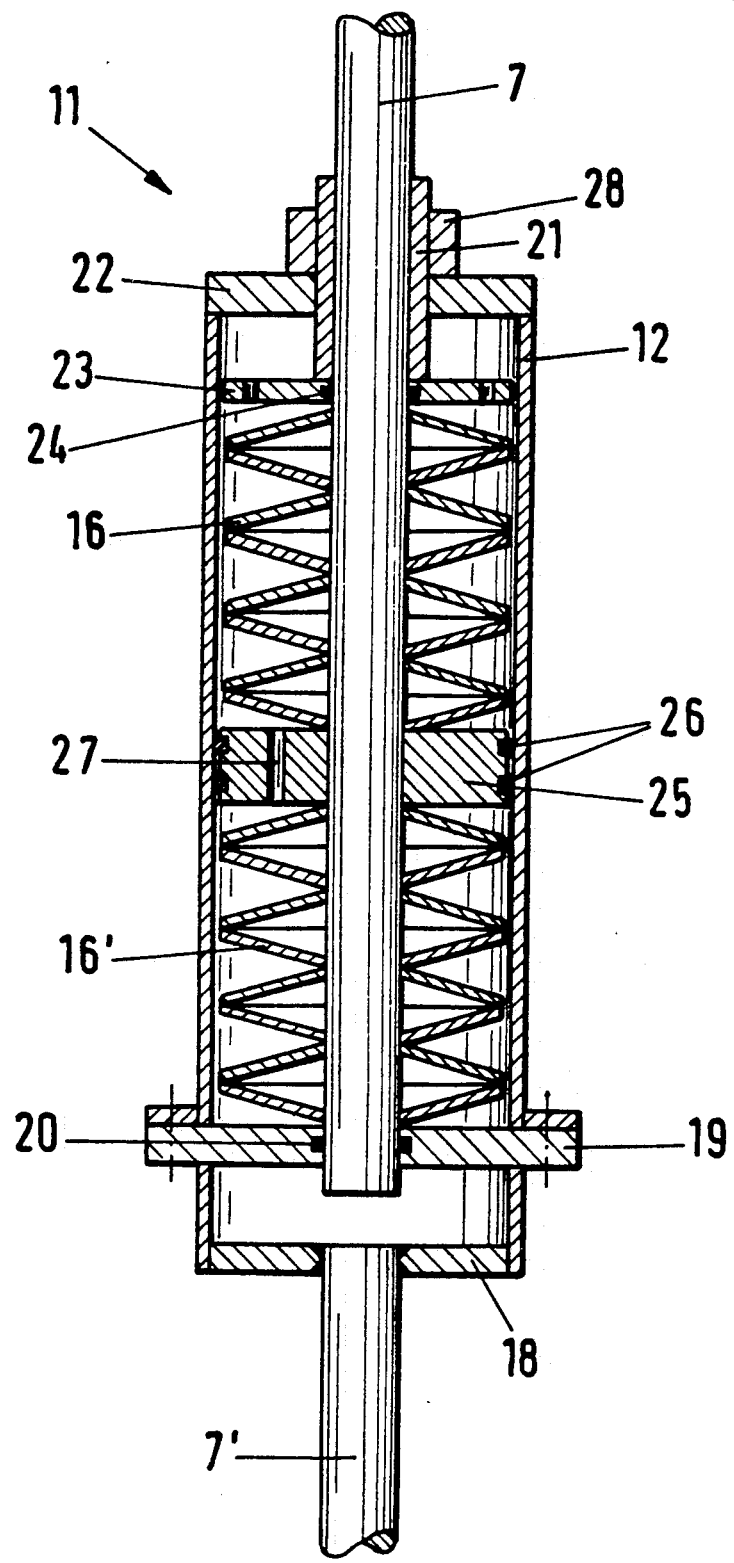
FIG. 4 is a longitudinal sectional view of a pre-tensionable spring element with hydraulic damping.

In accordance with the invention, as shown in FIGS. 3 and 4, the guide rods 7, provided in two parts 7, 7', are so developed and arranged that they are aligned and that their free ends are opposite to and spaced from each other. The free ends of the guide rods 7, 7' are connected to each other by spring elements 11. In the embodiment shown in FIG. 3, the spring element 11 includes a cylindrical housing 12 into which the free ends of the guide rods 7, 7' extend. At one end the housing 12 is connected to a plate 13 which has a central opening through which the guide rod 7 passes. Between the plate 13 and a disk 14 fastened on the lower end of the guide rod 7 and held by a nut 15 there is arranged a spring assembly 16 which surrounds and is spaced from the guide rod 7. By means of a lock nut 17, the spring assembly 16 can be adjusted to the desired initial tension. The disk 14 is arranged for sliding within the housing 12.

A similar construction is provided for the guide rod 7'. In this case, the plate 13' is fastened in the inside of the housing 12. The spring assembly 16' is held and pre-tensioned by the nut 15' and the lock nut 17' and disk 14'.

FIG. 4 shows a pre-tensionable spring element 11 having an oil filling for the damping of the spring action. In this case the free end of the guide rod 7' is provided with a flange 18 which is rigidly attached to one end of the housing 12. The guide rod 7, which passes through the housing 12 over practically its entire length, is guided slidably in the region of its free end by an aperture disk 19 which is rigidly attached to the housing and by a seal 20 present therein. Furthermore, the guide rod 7 is slidably mounted within a sleeve 21 at the entrance into the housing 12. The sleeve 21 passes through the end surface 22 of the housing 12 and is borne by it. Within the housing 12, the sleeve 21 is provided with an abutment plate 23 for a first spring assembly 16. The guide rod 7 is also sealed off at 24 with respect to a central opening in the abutment plate 23. The first spring assembly 16 is separated from a second spring assembly 16' by a flat piston 25, the piston 25 being fastened on the guide rod 7 and being slidably guided by sealing rings 26 against the inner wall of the housing 12. In the piston 25 and the abutment 23 there are passage openings 27 for the oil filling, these openings being preferably parallel to the axis of the guide rod 7. The spring assembly 16 can be adjusted to the desired initial tension by an adjusting device 28. The spring assemblies 16, 16' are spaced both from the guide rod 7 and from the inner wall of the housing 12 so that circulation of the oil within the housing is assured.

Since these as well as further embodiments and modifications thereto are intended to be within the scope of the present invention, the above description should be construed as illustrative and not in a limiting sense, the scope of the invention being defined solely by the following claims.

What is claimed is:

1. A torque support for drives riding on trunnions, in particular for converter tilt drives, including a gear housing mounted on said trunnion which is rotatable about an axis of rotation, a drive motor attached by a flange or bolting to a step-down gearing which engages, via pinion, with a large gear wheel fixed for rotation on the trunnion, said torque support comprising:

a pair of guide rods located symmetrically to said axis of rotation of said trunnion, each guide rod (7) comprising a first and second oppositely positioned part (7,7'), said first and second guide rod part having an upper and lower end and a respective free end opposite thereto;

means for pivotally mounting said upper ends on said gear housing;

means for pivotally attaching each of said lower ends to means for interconnecting said lower ends to each other, said interconnecting means comprising a member deformable by one of compression-tension or torsion; and a spring element (11) for connecting said free ends of said first and second guide rod parts in spaced relation from said mounting means, said spring element (11) acting in tension and compression and comprising springs (16, 16') and means for predeterminately pre-stressing said springs.

2. The torque support according to claim 1, additionally comprising a cylindrical housing (12), said first guide rod (7) having an axis and said free end thereof extending into said housing (12); said housing concentrically surrounding said axis of said first guide rod; a sleeve (21) at one end of said housing for slidably guiding said first guide rod therethrough; said second guide rod (7') being connected to said housing (12); and said springs (16, 16') surrounding said first guide rod in spaced relation within said housing.

3. The torque support according to claim 2, wherein said housing (12) is filled with oil, and additionally comprising a piston (25) mounted to said first guide rod (7) within said housing separating said springs (16, 16'); said piston having an axial opening (27) therein for permitting said oil to pass therethrough; and seals (26) between said piston and said housing.

4. The torque support according to claim 1, additionally comprising a housing (12); said free ends of said guide rods (7, 7') extending into said housing and supporting said springs (16, 16') thereon; said housing (12) concentrically surrounding said guide rods.

5. The torque support according to claim 4, additionally comprising an end plate (13) on said housing (12) having an aperture therein for slidingly guiding said first guide rod (7) therethrough; a disc (14) mounted on said free end of said first guide rod (7), one of said springs (16) being positioned between said end plate (13) and said disc (14); means on said first guide rod for adjusting said spring tension by adjusting the distance between said end plate (13) and said disc (14); a second plate (13') within said housing mounted on said free end of said second guide rod (7'); a second disc (14') surrounding said second guide rod (7') at a distance from said second plate (13'); another said spring (16') being positioned between said second plate (13') and said second disc (14'); and means on said second guide rod (7') for adjusting said spring tension by adjusting the axial distance between said second plate (13') and said second disc (14').

* * * * *